No. 794,543. PATENTED JULY 11, 1905.
I. F. PECK & C. HIRD.
APPARATUS FOR MAKING SPINNING BOBBINS.
APPLICATION FILED JULY 18, 1904.
7 SHEETS—SHEET 3.
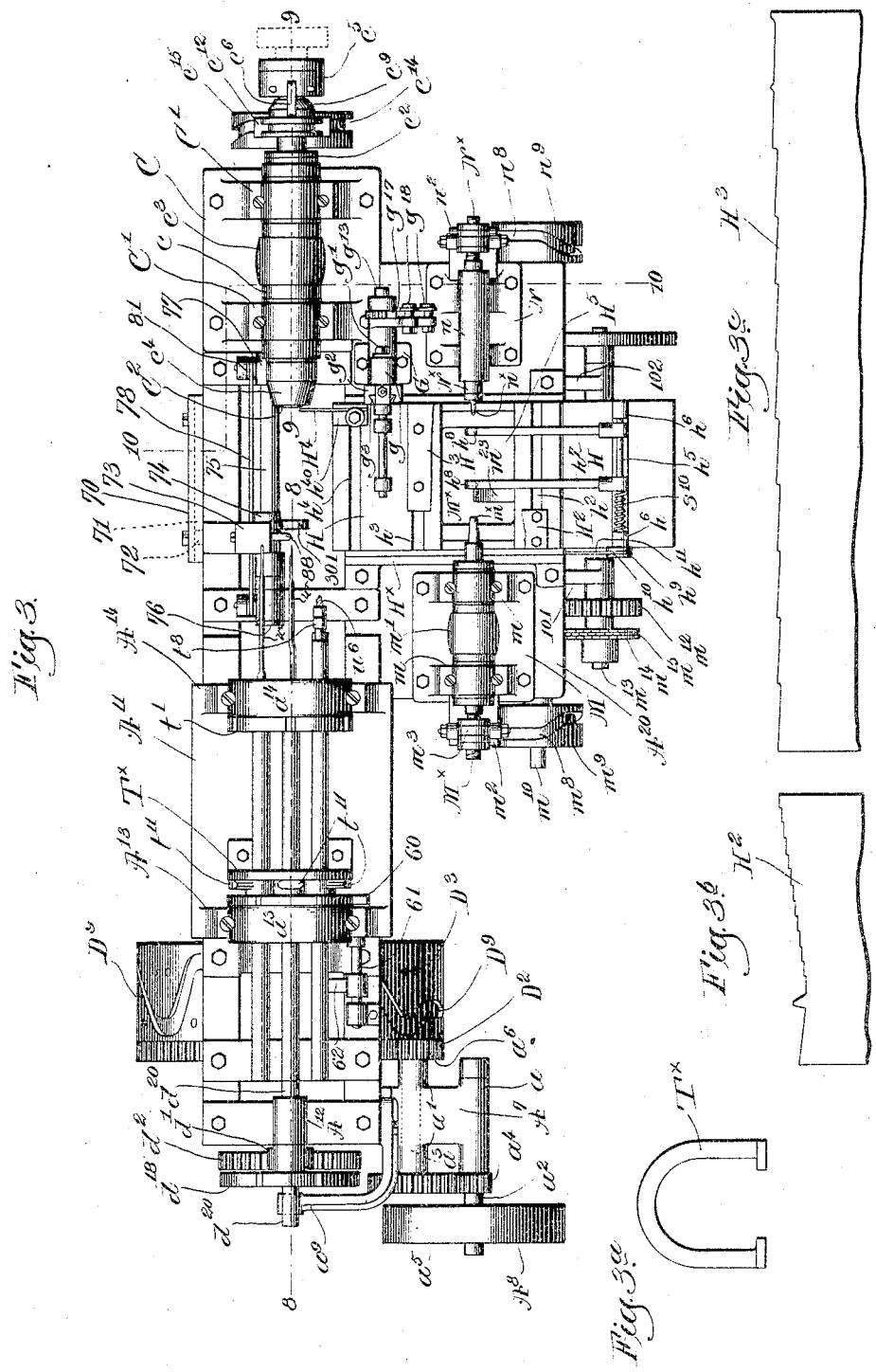
Witnesses.
Thomas J. Drummond
Warren W. Owen
Inventors.
Ira F. Peck,
Charles Hird,
by Kenby Gregory atty's No. 794,543. PATENTED JULY 11, 1905.
I. F. PECK & C. HIRD.
APPARATUS FOR MAKING SPINNING BOBBINS.
APPLICATION FILED JULY 18, 1904.
7 SHEETS—SHEET 4.
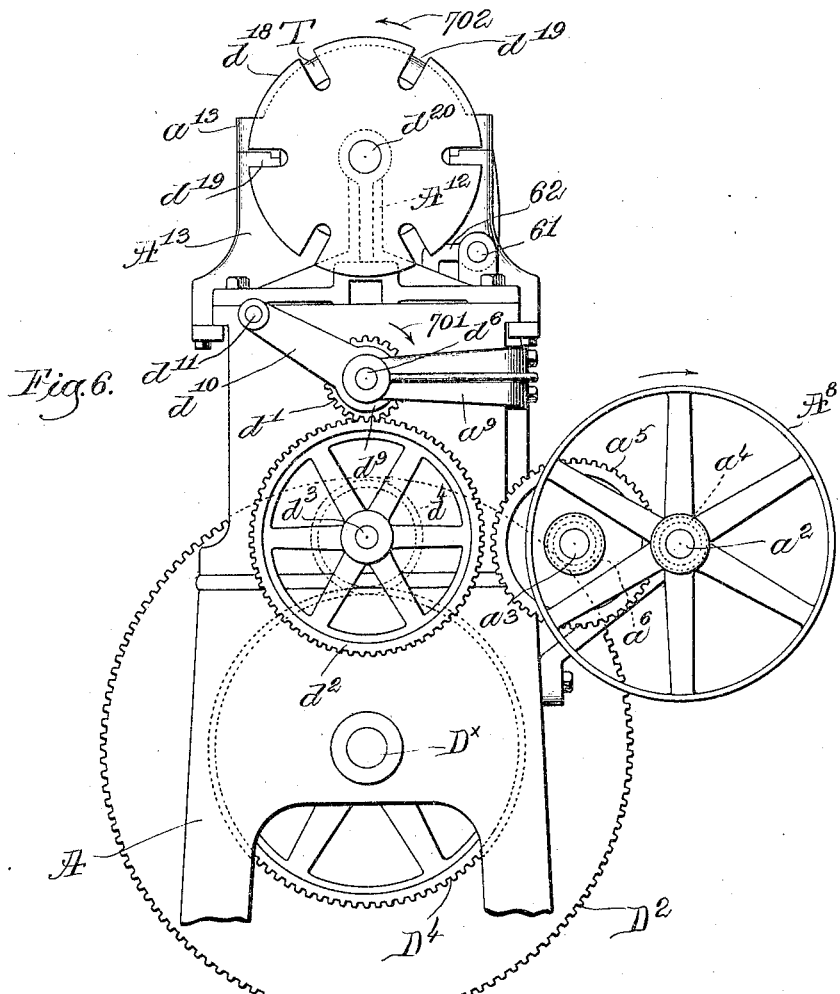
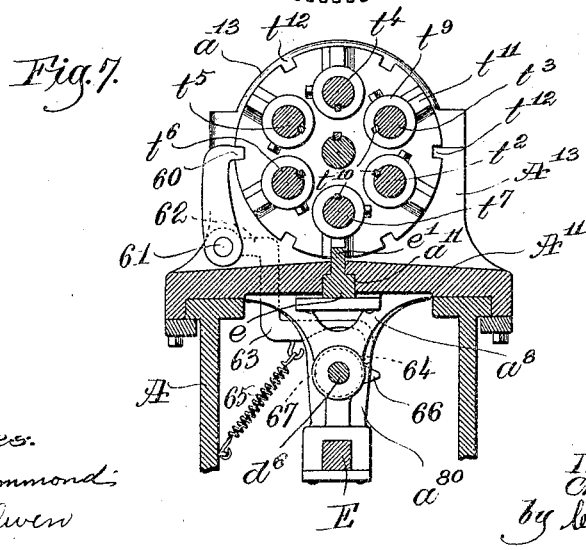
Witnesses.
Thomas J. Drummond
Warren D. Owen
Inventors.
Ira F. Peck,
Charles Hird,
by Crosby Gregory Attys.

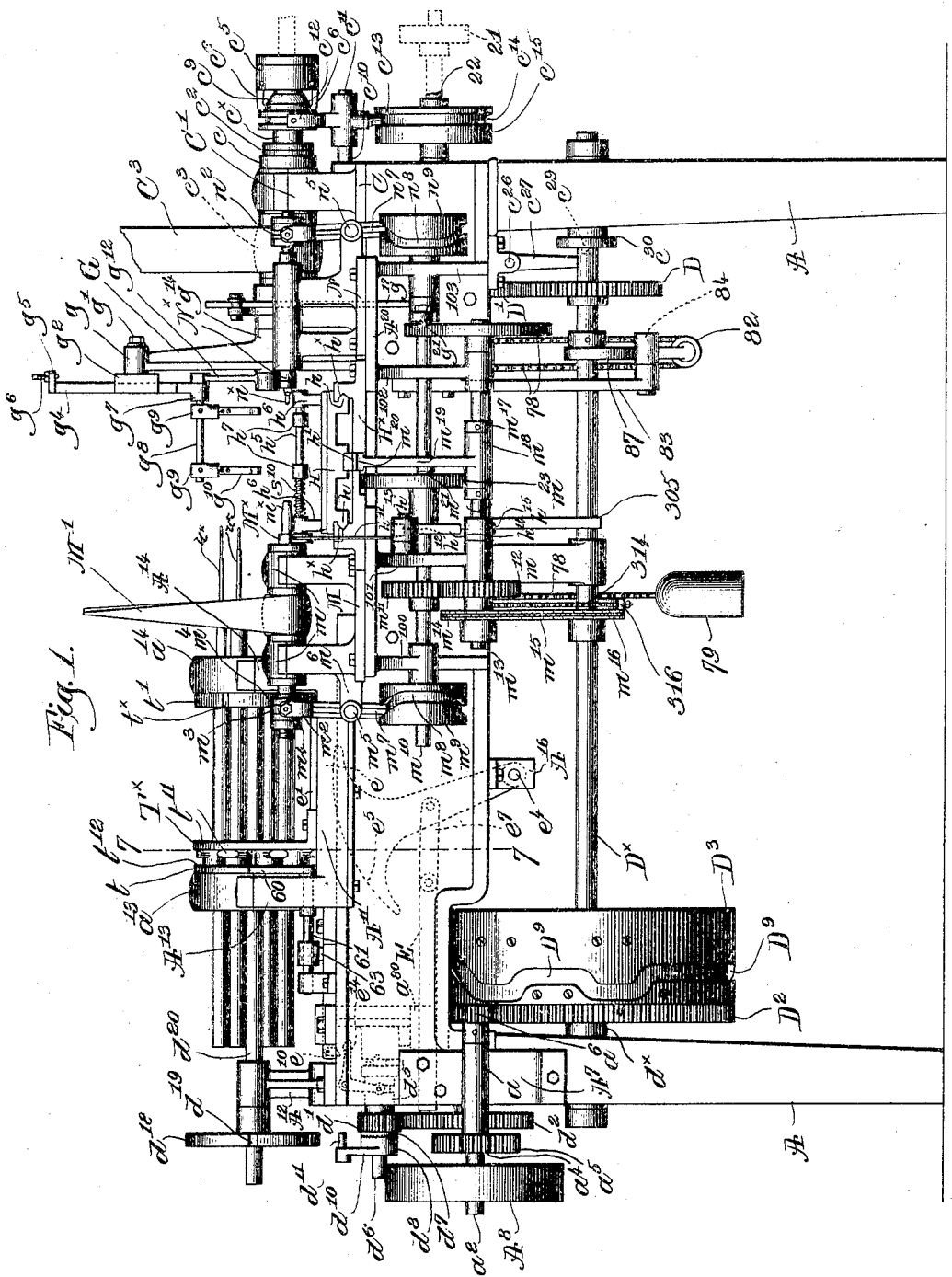

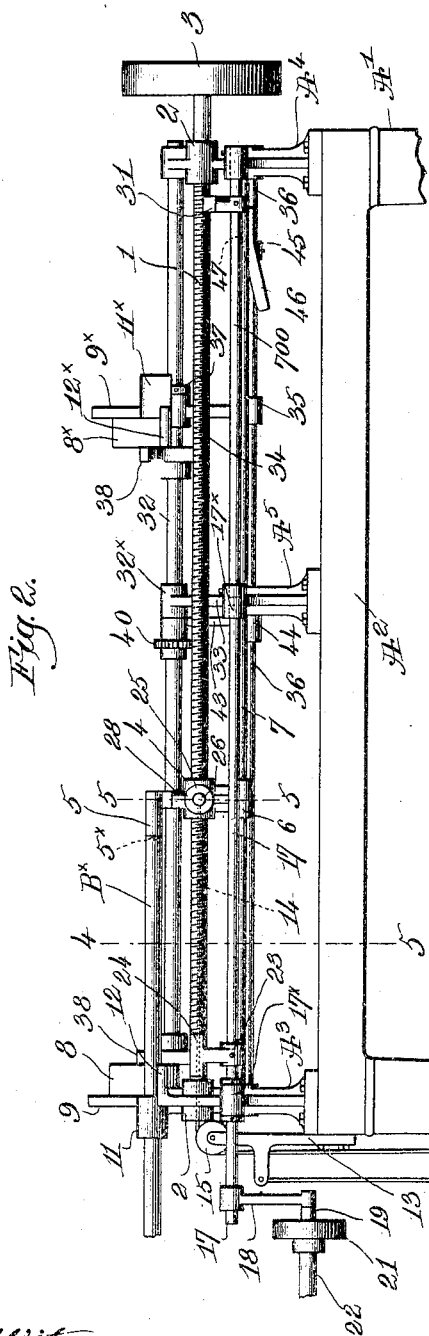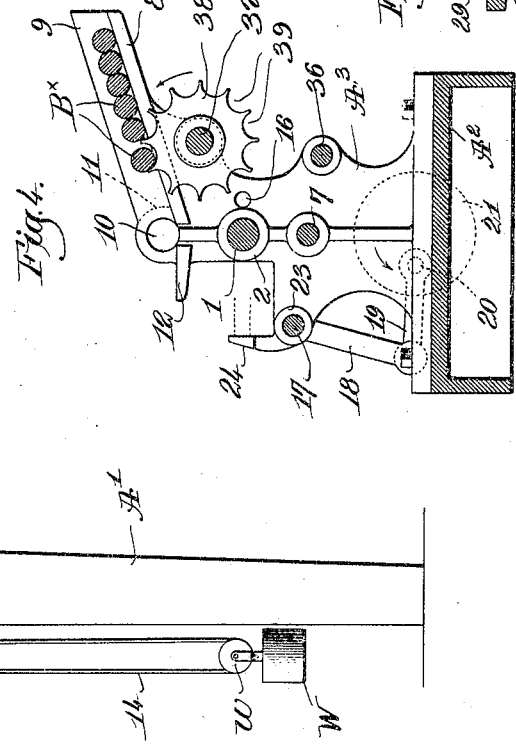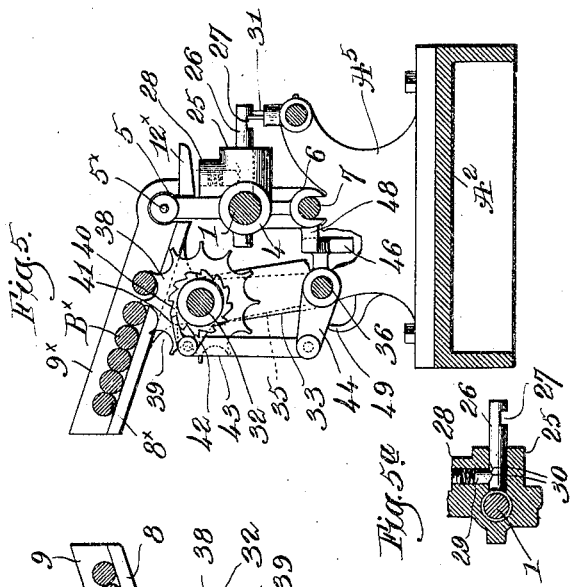

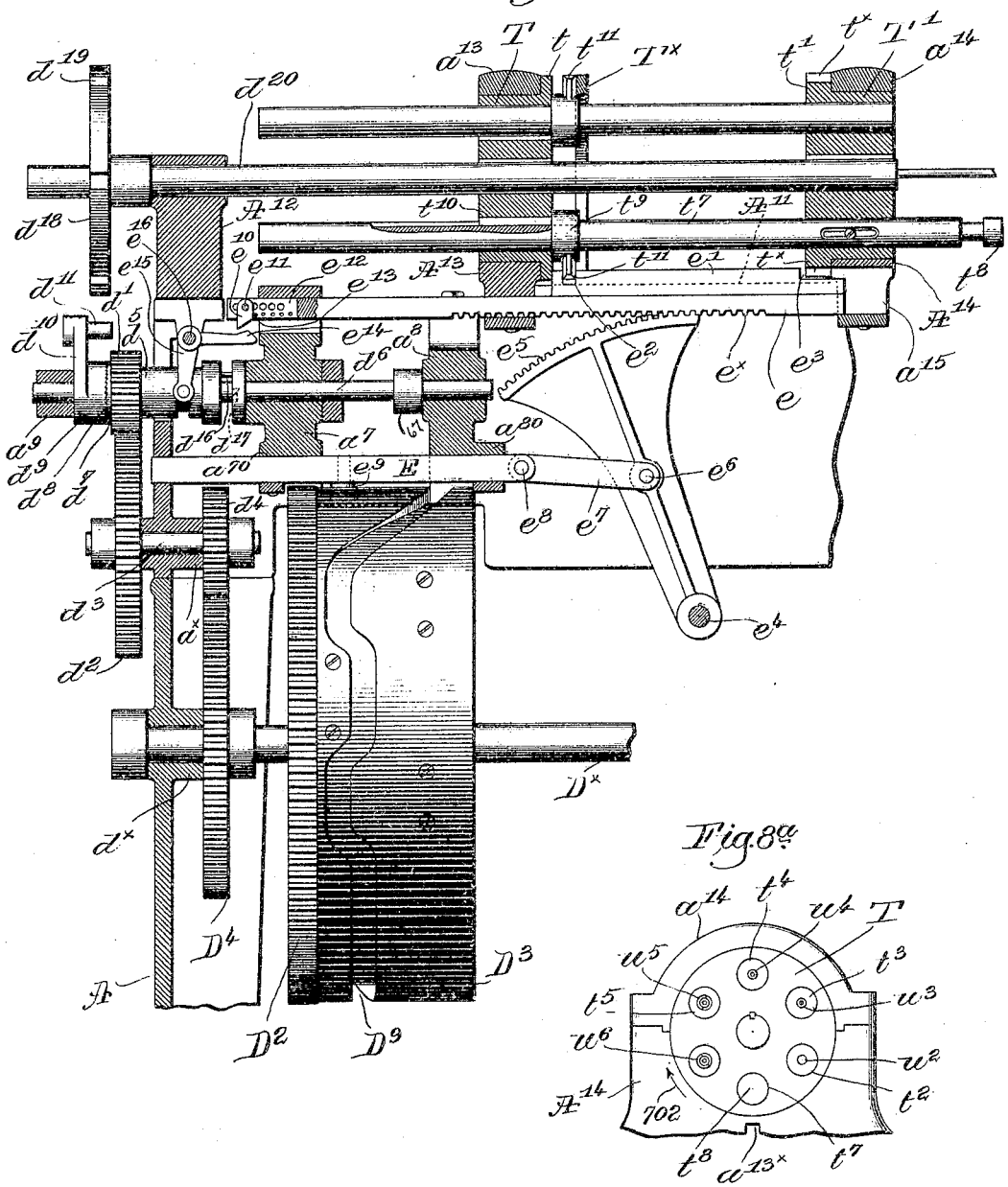

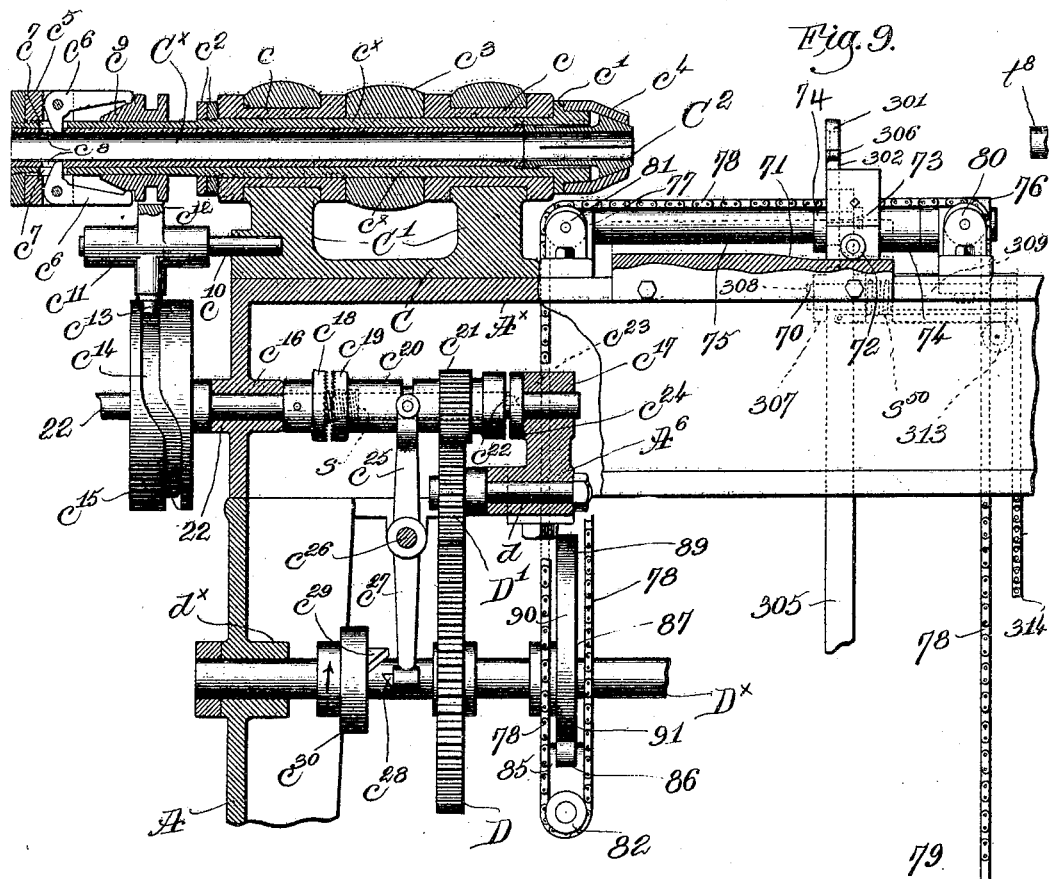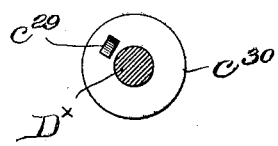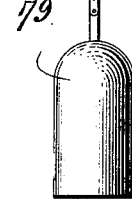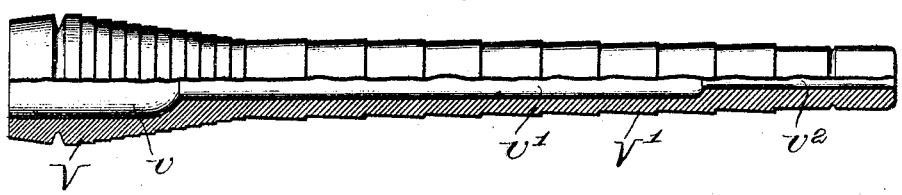

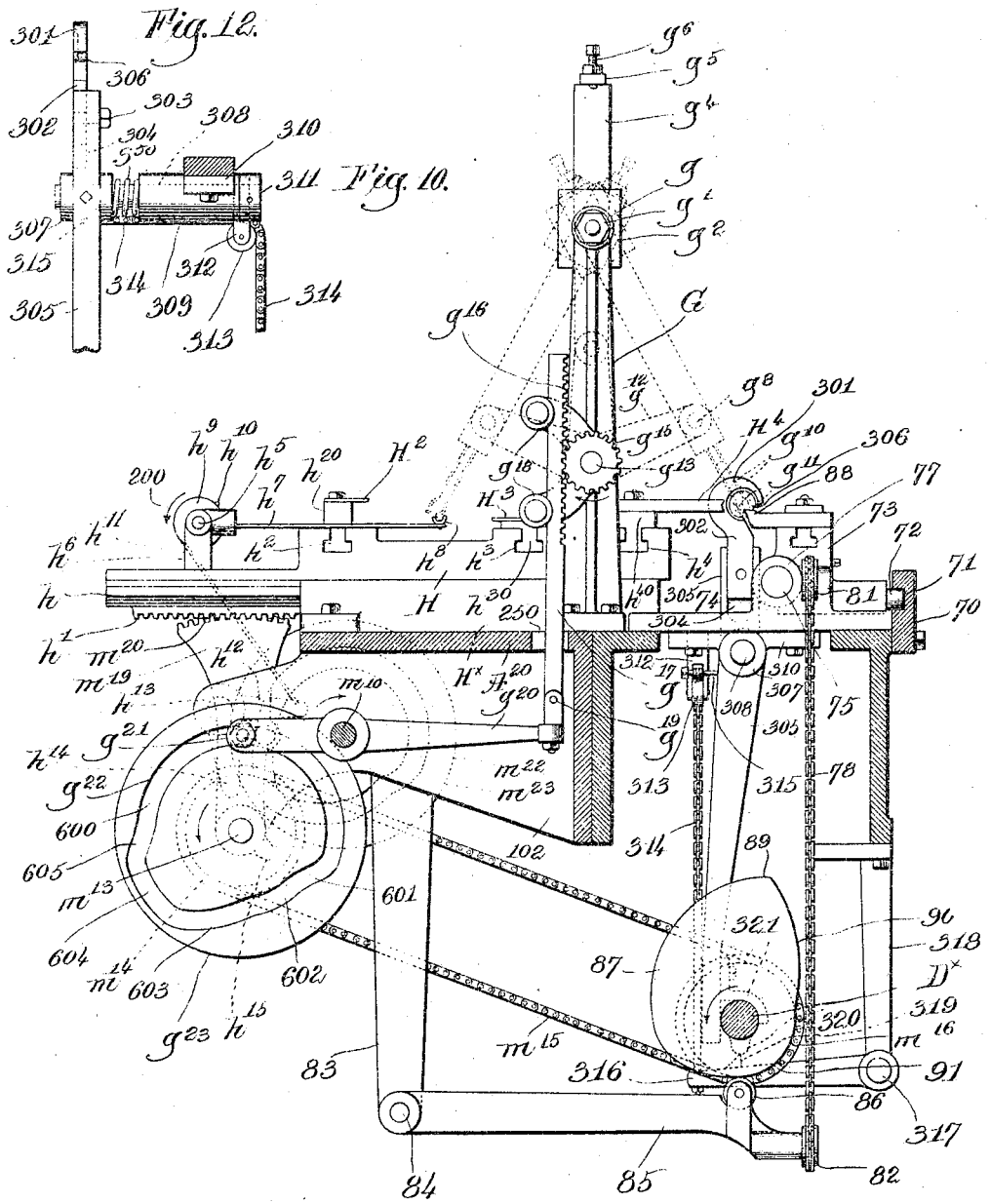

No. 794,543. Patented July 11, 1905.

UNITED STATES PATENT OFFICE.

IRA F. PECK, OF AUBURN, AND CHARLES HIRD, OF WOONSOCKET, RHODE ISLAND, ASSIGNORS OF THREE-EIGHTHS TO GEORGE F. WILLETT, OF NORWOOD, MASSACHUSETTS, THREE-EIGHTHS TO COLIN C. BELL, OF BROOKLINE, MASSACHUSETTS, AND ONE-FOURTH TO RUFUS B. GOFF, OF PROVIDENCE, RHODE ISLAND.

APPARATUS FOR MAKING SPINNING-BOBBINS.

SPECIFICATION forming part of Letters Patent No. 794,543, dated July 11, 1905.

Application filed July 18, 1904. Serial No. 217,038.

*To all whom it may concern:*

Be it known that we, IRA F. PECK, a citizen of the United States, and a resident of Auburn, and CHARLES HIRD, a subject of the King of Great Britain, and a resident of Woonsocket, county of Providence, State of Rhode Island, have invented an Improvement in Apparatus for Making Spinning-Bobbins, of which the following description, in connection with the accompanying drawings, is a specification, like characters on the drawings representing like parts.

This invention has for its object the production of an apparatus for making bobbins on which yarn is spun, to be subsequently used in the shuttle of a loom. Such bobbins are made of wood and comprise an elongated barrel and an enlarged chambered head, and a longitudinal bore is provided to receive the spindle on the spinning-frame, and usually the exterior of the bobbin is tapered from the head to the adjacent portion of the barrel and shaped to present an annularly-stepped surface. Very frequently the barrel is shaped to present a series of slightly-tapered sections inclined toward the head of the bobbin to more securely retain the yarn in position when spun upon the bobbin.

In the present invention the bobbins are formed from a cylindrical wooden blank, which is fed forward intermittingly a distance equal to the length of a bobbin and then clamped in a rotating chuck or work-holder. A movable head is provided with a series of tool-carriers, each provided with a suitable tool to act upon the blank, the tools acting successively to form the longitudinal bore in the bobbin and the chamber in the head. The tool-carriers are arranged in proper order in the head, and the latter is intermittingly moved to present one of the tool-carriers at a time into operative position to coöperate with the rotating blank. When a tool-carrier is in operative position, actuating means move the same longitudinally in the direction of the length of the blank, so that the particular tool with which the carrier is provided will act upon the blank and perform its proper function, after which the tool-carrier is withdrawn and the head is then moved to bring the next tool-carrier into operative position. A common actuating means is provided for the several tool-carriers and for a stop, which is also carried by the head, the stop being operated to engage the leading end of the blank when the latter is fed forward and stop the blank in readiness to be clamped. While the interior of the blank is being acted upon by the appropriate tools, the exterior is rough-shaped by a tool, which is moved longitudinally of the blank and in such a path that the proper contour is imparted to the blank. The rough-shaped bobbin is now ready to be separated from the rod-like blank, and this is effected by a cutting-off tool. Before this is done, however, the bobbin is engaged by a transferrer, which supports it while it is cut off, and immediately the transferrer removes it to one side and positions it between two separated rotating spindles in alinement with each other. When the bobbin is positioned between them, the spindles are moved toward each other to engage and clamp the bobbin between them, the bobbin thereupon rotating with said spindles while the transferrer returns to its normal position. While the bobbin is thus clamped and rotated, finishing-tools are brought into position to act upon its exterior to give the final shape to the barrel and head, and when finished the spindles are withdrawn from the ends of and release the bobbin, and a knock-off device removes the completed bobbin from the apparatus.

As will appear more clearly hereinafter, while one bobbin is being bored and rough-finished the preceding one is being acted upon by the finishing-tools, so that after the first bobbin is started there will be two at a time in process of making.

The various steps of the process are conducted automatically and are so timed with relation to each other that one instrumentality takes up its appointed task at the proper instant and leaves the work in readiness for the next step of the process. The stock is turned or otherwise shaped into long cylindrical rod-like blanks in any suitable manner, which are delivered one by one from a suitable hopper into position to be fed to the tools, the construction of the blank-delivery mechanism being such that when one blank has been fed forward another is presented to immediately follow it. During the boring and rough-finishing of the work the outer end thereof is rotatably sustained in a suitable support to prevent chattering or vibration of the work, such support being automatically withdrawn when the bobbin is transferred to the finishing-tools.

The various novel features of our invention will be fully described in the subjoined specification, and particularly pointed out in the following claims.

Figure 1 is a front elevation of the main portion of a machine for making spinning-bobbins and embodying one practical form of our present invention, the work—i. e., the bobbin in process of construction—and the finishing-tools on the carriage being omitted in order to more clearly illustrate the mechanism. Fig. 2 is a front elevation of the right-hand end of the machine, showing the means for feeding the blank stock into position to be operated upon in the formation of the bobbins, it being understood that taking Figs. 1 and 2 together a front elevation of the complete apparatus is shown. Fig. 3 is a top or plan view of the mechanism shown in Fig. 1, the bobbin in process of construction being omitted and the finishing-tools being indicated. Fig. $3^a$ is a detail in front elevation of the guard which coöperates with the head in which the tool-carriers are mounted. Fig. $3^b$ is an enlarged plan view of one of the finishing-tools indicated in Fig. 3. Fig. $3^c$ is a similar view of another of the finishing-tools, to be hereinafter referred to. Fig. 4 is a transverse sectional view of the blank-feeding means on the line 4 5, Fig. 2, looking toward the left. Fig. 5 is a similar view on the line 4 5, but looking toward the right. Fig. $5^a$ is an enlarged section on line 5 5, Fig. 2. Fig. 6 is an enlarged left-hand end elevation of a portion of the apparatus shown in Figs. 1 and 3, the finishing mechanism being omitted. Fig. 7 is an enlarged transverse section on the line 7 7, Fig. 1, looking toward the left, showing the construction of the head and the manner of mounting the tool-carriers therein. Fig. 8 is a greatly-enlarged longitudinal sectional detail on the line 8 8, Fig. 3, showing the head and tool-carriers and the mechanism for operating the latter. Fig. $8^a$ is a face view of the tool-carriers and tools carried thereby as would appear looking at the right-hand end of the head, Fig. 8. Fig. 9 is an enlarged longitudinal section on the line 9 9, Fig. 3, but viewed from the back of the machine, showing the construction of the rotatable work-holder or chuck and the means for controlling the same. Figs. $9^a$ and $9^b$ are details of parts of the mechanism shown in Fig. 9 and to be referred to. Fig. 10 is a transverse section, enlarged, on the line 10 10, Fig. 3, looking toward the left and leaving out the work-holder or chuck and the means for supporting the work during the finishing operation, the mechanism illustrated serving to transfer the rough-finished blank from the work-holder to the finishing devices. Fig. 11 is a half-longitudinal section and elevation of a completed bobbin; and Fig. 12 is a rear side elevation, enlarged, of the support for the outer end of the work.

The various operative parts of the apparatus are supported on a suitable frame which is sustained on upright legs or standards A A, Fig. 1, and A' A', Fig. 2, the latter being connected by an elongated top plate $A^2$, on which are bolted stands $A^3$ $A^4$, the former being shown in inner side elevation in Fig. 4.

The mechanism for feeding the blank stock to the work-holder or chuck will first be described.

A long screw-threaded shaft 1 is rotatably mounted in bearings 2 on the stands and provided with a pulley 3, Fig. 2, to receive a belt (not shown) driven from a suitable source of power, and a blank-feeder, shown as a sleeve 4, having an upturned ⏌-shaped projection 5, loosely embraces the shaft, Figs. 2 and 5, a bifurcated foot 6, depending from the sleeve, embracing a guide-rod 7, secured at its ends in the said stands. An upwardly-inclined and rearwardly-extended shelf 8 is rigidly secured to or forms a part of the stand $A^3$ and has an upturned flange 9, provided with a circular feed-opening 10, Fig. 4, above the shaft 1, the flange being provided with a curved hood-like extension 11 on its outer face concentric with the feed-opening, and a horizontal lip 12 is formed on the inner face of the stand in front of but separated from the lower end of the shelf 8.

Referring to Fig. 2, a bracket 13 is bolted to the top plate $A^2$ adjacent the stand $A^3$, and one end of a cord, chain, or other flexible member 14 is secured thereto, said member passing down under the pulley $w$ of a weight W and then up and over a guide-sheave 15 on the bracket, said flexible member leading thence through a hole 16, Fig. 4, in the stand to the sleeve 4, to which it is secured. The top of the feeder-head or projection 5 is in alinement with the opening 10 in the shelf-flange 9, and a centering-point $5^x$ is preferably made on the leading end of the projection, Figs. 2 and 5, for a purpose to be described. A rock-shaft 17 is mounted in bearings $17^x$ on the stand $A^3$ and an intermediate stand $A^5$ bolted to the top plate A², the projecting end of the rock-shaft having a depending arm 18, fast thereon, pivotally connected by a link 19 with a wrist-pin 20, Fig. 4, on a disk 21, mounted on a rotating shaft 22, to be again referred to, so that each rotation of said shaft will oscillate the rock-shaft. Adjacent the stand A³ a collar 23 is secured to the rock-shaft and provided with an upturned laterally-enlarged setting device or finger 24, which by means now to be described serves to operatively connect the blank-feeder 4 and threaded shaft 1. The said feeder is provided with a forwardly-extended tubular boss 25, in which is slidably mounted a follower 26, Figs. 5 and 5ª, its rear end being adapted to at times engage the thread on the shaft 1, so that rotation thereof will move the sleeve or feeder 4 to the right, Fig. 2, the front end of the follower having a notch 27 in its under side. A housing 28 on the top of the boss supports a spring-controlled detent 29, the point of which is adapted to enter one or the other of two depressions 30 in the top of the follower 26 to retain it in either operative or inoperative position. When the follower is retracted, as shown, the sleeve is free to move along the shaft 1, and at such time it is moved to the left, Fig. 2, by the weight W, acting through the flexible member or connection 14; but when the follower is moved into cooperation with the thread on said shaft rotation of the latter will move the blank feeder or sleeve to the right, elevating the weight. When the feeder is moved by the weight to the left-hand end of its stroke, the front end of the follower 26 is brought opposite the finger 24, and when the latter is moved rearwardly by rocking of the shaft 17 the follower is pushed into the boss 25 until it engages the screw-thread of shaft 1, whereupon the sleeve will be rapidly moved to the right, said shaft 1 being continuously rotated. Such movement will continue until a releasing device or cam 31, adjustably secured to a rod 700, engages the notch 27, the cam being diagonally arranged to readily enter the notch and draw the follower forward and disengage it from the threaded shaft as the sleeve 4 continues to move toward the right. As soon as the follower and shaft are disengaged the sleeve is released from the control of the retracting-shaft 1, and the weight W immediately reassumes control and begins to move the sleeve to the left.

By adjusting the position of the releasing device 31 on the rod 700, which latter is fixed in the stands A⁵ A⁴, the length of the stroke of the feeder or sleeve 4 is determined and varied, as may be necessary.

An intermittingly-rotated shaft 32 is mounted in suitable bearings in the end stands above and behind the retracting-shaft 1 and passes through a bearing 32ˣ, Fig. 2, in an upturned extension 33 of the stand A⁵, and on the shaft 32 between the stands A⁵ A⁴ we have loosely mounted a second shelf 8ˣ, having an upturned flange 9ˣ, the latter having an opening (not shown) in alinement with the opening 10, Fig. 4, and a hood-like extension 11ˣ and forwardly-projecting lip 12ˣ. A hub 34 on the under side of the shelf 8ˣ loosely embraces the shaft 32, and a depending tubular foot 35 loosely slides along a rock-shaft 36, to be referred to, to maintain the shelf 8ˣ in parallelism with the shelf 8. This shelf 8ˣ is prevented from lateral movement by an adjustable collar 37 on the shaft 32 at one side of the hub 34, and by a let-off wheel or disk 38, adjustably secured to the shaft on the opposite side of the hub.

The blank stock is made up as long cylindrical wooden rods Bˣ of sufficient diameter to permit the bobbins being made therefrom and of such length that a number of bobbins may be made from each blank, the shelf 8ˣ being adjusted so that a blank will readily enter between the two flanges 9 and 9ˣ and slide downward on the shelves, a series of the blanks resting on the shelves, as shown in Figs. 4 and 5. The blanks are delivered one by one in position to be fed forward, and the means for delivering the blanks will now be described.

Two of the let-off wheels 38 are provided, securely mounted on the shaft 32 adjacent the inner edges of the shelves 8 and 8ˣ, (see Fig. 2,) the peripheries of said wheels being provided with a series of substantially semicircular notches 39, and, as shown clearly in Figs. 4 and 5, the notched peripheries project above the upper faces of the shelves, said notches 39 being of such size as will easily receive one of the rods or blanks Bˣ. Normally the leading rod or blank of the series supported on the shelves will enter the uppermost notch in each let-off wheel, so that such blank cannot move forward until the said wheels have made a partial rotation in the direction of the arrow, Fig. 4. When such rotative movement is effected, the endmost blank is moved forward over the shelves and released, it sliding downward until it reaches the opening between the ends of the shelves and the backs of the lips 12 and 12ˣ, where it stops, and at the same time the let-off wheels engage the next blank of the series and move it into the position shown in Figs. 4 and 5. The release of the endmost blank by the let-off means is effected automatically, as will be described, when the blank-feeder 4 is almost at the end of its retracting stroke, so that when the blank stops, as has been described, it is in the path of movement of the feeder-head 5 and ready to be fed through the opening 10, Fig. 4. A ratchet 40, fast on the shaft 32, is engaged by a pawl 41 on a pawl-carrier 42, mounted to rock on said shaft and connected by a link 43, Fig. 5, with a rocker-arm 44, fast on the rock-shaft 36. The latter has adjustably secured to it near the stand $A^4$ a collar 45, Fig. 2, having attached to it a longitudinally-extended cam 46, the upper face of the cam rising gradually to the high part 47, (see dotted lines, Fig. 2,) this cam being in the path of a rearwardly-projecting toe 48 on the back of the extension 6 on the blank-feeder 4. (See Fig. 5.) Just before the blank-feeder reaches the end of its retracting stroke the toe 48 engages the cam 46 and depresses the latter, turning the rock-shaft 36 in the direction of the arrow, Fig. 5, so that the pawl 41 is moved forward in engagement with the ratchet 40, advancing the shaft 32 and attached let-off wheels 38 far enough to move forward and release the endmost blank as the toe 48 rides over the high part of the cam. The high part is made long, so that the toe will not run off the right hand end thereof as the blank-feeder completes its retracting stroke, and as soon as said blank-feeder is moved by the weight W beyond the cam the latter is released and the weight of the rocker-arm 44 and link 43 returns the rock-shaft 36 to normal position and retracts the pawl, the arm 44 bringing up against a stop 49, Fig. 5.

Remembering that a blank has been delivered into feeding position while the blank-feeder is completing its retracting stroke, it will be manifest that when the feeder next moves to the left, viewing Fig. 2, its head 5 will engage the right-hand end of the blank, the point $5^\times$ entering the wood to give a firm hold thereon, and the continued movement of the feeder to the left will feed the blank along to the work-holder. Such feed movement continues until the rear end of the blank is beyond the flange 9, so as to avoid interference with the delivery of the next blank into feeding position, the setting device or finger 24 then operating to connect the blank-feeder and retracting-shaft 1 by or through the follower 26, as has been described.

When a blank has been fed as far as possible by the blank-feeder, its continued feed movement is effected by the next blank as it is fed along by the blank-feeder, such operation being continued as long as the machine is in operation and a supply of blanks is sustained on the shelves 8 and $8^\times$. The clearance between the front end of the shelf $8^\times$ and the lip $12^\times$ is sufficient to permit the passage of the upright portion of the feeder-head 5 as the blank-feeder 4 moves back and forth.

As will appear hereinafter, the blank is fed step by step and held by and to rotate with the work-holder and released thereby alternately, the feed taking place when the blank is released, and I will now describe the work-holder and the controlling means therefor.

Having reference more particularly to Figs. 1, 3, and 9, the top plate $A^\times$, supported by the legs or standards A, has secured to it at one end a plate C, having upturned bearings $C'$ for bushings $c$, Fig. 9, in which are rotatably mounted two concentric tubes $C^\times c^\times$, the latter having an annular flange $c'$ at one end adjacent one of the bushings $c$, and check-nuts $c^2$, screwed upon it adjacent the opposite end of the other bushing, to prevent longitudinal movement of said tube. The latter is provided with a fast pulley $c^3$ to receive a belt $C^3$, Fig. 1, by means of which the tube $c^\times$ is continuously rotated, the longitudinal axis of the tubes being coincident with the longitudinal center of a blank in feeding position. Beyond the flange $c'$ the tube $c^\times$ is threaded to receive a conical cap $c^4$, which fits over a work-holder or chuck $C^2$ of a common form and shown herein in Fig. 9 as a tubular split chuck mounted within the tube $c^\times$ and abutting against one end of the inner tube $C^\times$, which is longitudinally movable in the tube $c^\times$. When the tube $C^\times$ is moved to the right, Fig. 9, the chuck is forced against the conical cap and closed, and if a blank be in position at such time the chuck will firmly hold it to be rotated in unison with the tubes $C^\times c^\times$, frictional engagement of the cap and chuck effecting rotation thereof in unison. The outer end of the tube $c^\times$, projecting toward the blank-feeding mechanism, has fast upon it a collar $c^5$, on which are fulcrumed bell-cranks $c^6$, the short arms whereof extend through slots $c^7$ in the tube into openings $c^8$ in the inner tube $C^\times$, (clearly shown in Fig. 9,) while the long external arms of the bell-cranks coöperate with an annularly-grooved cone $c^9$, loosely mounted on the said tube $c^\times$. When this cone is in the position shown in Fig. 9, the work-holder or chuck $C^2$ is clamped or closed, and when the cone is moved to the right the resiliency of the chuck will cause it to open and the controlling-tube $C^\times$ will be moved to the left.

It is to be borne in mind that the apparatus shown in Fig. 9 is viewed from the back of the machine, so that the incoming blank would be fed into the tube $C^\times$ at the end at which the chuck-controller is mounted, the said tube steadying and guiding the blank to the chuck. A horizontal stud $c^{10}$, projecting outward from one of the bearings $C'$, slidably supports a sleeve $c^{11}$, having an upturned yoke $c^{12}$, which coöperates with the cone $c^9$ to position the same, a roller or other stud $c^{13}$, depending from the sleeve, entering a cam-groove $c^{14}$ on the periphery of a disk $c^{15}$, fast on the shaft 22, hereinbefore referred to, and supported in bearings $c^{16} c^{17}$, Fig. 9.

The clutch-controlling cam is of the so-called "one-revolution" type—i. e., it makes one revolution and stops, then makes another revolution and stops, and so on, the mechanism for effecting this operation not being of our invention, broadly, and will be given a brief description, the shaft 22 being arranged to make one revolution for every revolution of the tool-carrier head to be described.

Referring to Fig. 9, a fast clutch member $c^{18}$ is secured to the shaft adjacent a coöperating member $c^{19}$, formed on a sliding sleeve $c^{20}$, loose on the shaft and recessed to receive a spring $s$, which acts to separate the clutch members, the opposite end of the sleeve having fast on it a pinion $c^{21}$, and a stop-pin $c^{22}$ projects beyond the end of the sleeve at one side of its center, said pin being adapted to enter a socket $c^{23}$ in an annular plate $c^{24}$ (shown separately in Fig. 9$^a$) and attached to the end of the bearing $c^{17}$.

The clutch is open in Fig. 9, and at such time the pin $c^{22}$ is held in the socket by the spring $s$, so that the shaft 22 and the chuck-controlling cam thereon are locked from movement.

A yoke $c^{25}$ is fulcrumed at $c^{26}$ on the main frame of the machine and coöperates with the sleeve $c^{20}$ to move it longitudinally, the yoke having a depending extension $c^{27}$, provided with a lateral bevel-faced lug $c^{28}$. The latter is in the path of movement of a beveled trip $c^{29}$ on a disk $c^{30}$, fast on the main or principal shaft $D^\times$ of the machine, rotatably supported in suitable bearings $d^\times$, Figs. 1 and 9, the disk and trip being shown in face view, Fig. 9$^b$.

A large gear D, fast on the shaft, meshes with an intermediate small gear D', rotatable on a stud $d$, secured in the cross-girth $A^6$ of the main frame, the gear D' in turn meshing with the pinion $c^{21}$ to drive the same, the bearing $c^{17}$ being formed as a part of the cross-girth. When the rotation of shaft $D^\times$ brings the trip $c^{29}$ into engagement with the lug $c^{28}$, the yoke $c^{25}$ is rocked to slide the sleeve $c^{20}$ to the left, Fig. 9, withdrawing the stop-pin $c^{22}$ from the socket $c^{23}$ and bringing the clutch members into coöperation, so that the shaft 22 will be rotated, the pin $c^{22}$ riding on the face of the plate $c^{24}$ and maintaining the clutch operative after the trip has passed beyond the lug $c^{28}$. The chuck or work-holder $C^2$ is opened, the blank is fed forward to operative position, and the chuck is closed upon it by the time the pin $c^{22}$ comes opposite the recess $c^{23}$, and thereupon the spring $s$ expands, separating the clutch members as the pin enters said socket. Such revolution of the shaft 22 also acts, through the arm 18 and link 19, to rock the shaft 17, as has been described, to operate the setting device 24 if the blank-feeder 4 has reached the end of its feed movement.

Referring to Figs. 1 and 3, the frame at the left-hand end of the machine has secured to it a bracket $A^7$, provided with long horizontal bearings $a\, a'$ for short shafts $a^2\, a^3$, respectively, the former having fast upon it a belt-pulley $A^8$ and a pinion $a^4$, Fig. 3, which meshes with a gear $a^5$, fast on the outer end of shaft $a^3$. (Shown in dotted lines, Fig. 3.) A pinion $a^6$, fast on the inner end of the shaft $a^3$, meshes with a large gear $D^2$, secured to a drum $D^3$, fast on the main shaft $D^\times$, the drum having a cam-path thereon to be referred to. The pulley $A^8$ is rotated continuously by a belt (not shown) and through the gearing referred to effects the constant rotation of the main shaft $D^\times$ at a comparatively slow speed, and we have termed such shaft the "main" shaft, as it is the principal controlling and actuating shaft of the major portion of the machine. Between the drum $D^3$ and the adjacent bearing $D^\times$, Fig. 8, a gear $D^4$, somewhat smaller than the gear $D^2$, is fixed on the main shaft and meshes with a small gear $d^4$, fast on a short shaft $d^3$, rotatably mounted in a bearing $a^\times$ on the main frame, a larger gear $d^2$, fast on the shaft outside the frame, in turn meshing with a pinion $d'$. This pinion is fast on a sleeve $d^5$, Fig. 8, rotatable and longitudinally slidable on a clutch-shaft $d^6$, rotatably mounted in cross-girths $a^7\, a^8$ of the frame, one member $d^7$ of a clutch being formed on the outer end of the sleeve, its coöperating member $d^8$ being formed on the inner end of a hub $d^9$, fast on the shaft, and having a radial arm $d^{10}$, extended therefrom and provided near its free end with an inturned stud $d^{11}$. A rigid bracket $a^9$ on the end of the frame (and omitted in Fig. 1) receives and forms a supporting-bearing for the outer end of the clutch-shaft $d^6$, which is intermittingly rotated and is arranged to make one revolution and stop, a pin $d^{16}$ on the inner end of the sleeve $d^5$ entering a recess $d^{17}$ (see dotted lines, Fig. 8) at the end of the bearing $a^7$ to permit a spring (not shown) to expand and separate the clutch members, substantially as described with relation to the one-revolution shaft 22 and the clutch device for operating the same and shown in Fig. 9. The direction of rotation of the shaft $d^6$ is indicated by the arrow 701, Fig. 6.

A circular disk $d^{18}$, having a series of peripheral notches $d^{19}$, (shown in Fig. 6 as six in number,) is secured to a shaft $d^{20}$, rotatably mounted at its outer end in a stand $A^{12}$, secured to the top of the main frame, the disk $d^{18}$ being located above the wrist-pin or stud $d^{11}$ on the rotatable arm $d^{10}$, and by reference to Fig. 6 it will be seen that the relative arrangement of said stud and the notches in the disk is such that for every revolution of the shaft $d^6$ the stud $d^{11}$ will enter one of the notches $d^9$ and will rotate the disk and its supporting-shaft $d^{20}$ through one-sixth of a revolution. The shaft $d^{20}$ has keyed to it two rather thick and circular disks T T', constituting a head, the disks being annularly flanged at $t\, t'$, respectively, the flange $t'$ being provided with six peripheral notches $t^\times$, two of which are shown in Fig. 8, the disks being rotatably supported in two rigid bearings $A^{13}\, A^{14}$, respectively, and provided with caps $a^{13}\, a^{14}$, respectively. The bearing $A^{14}$ and its cap, together with the disk T, are shown clearly in Fig. 8$^a$. A series of circularly-arranged and longitudinally-slidable carriers are mounted in the disks, and, referring to Figs. 7 and 8$^a$, we have shown six of such carriers, $t^2\, t^3\, t^7$, the latter having secured to or mounted upon its inner end, viewing Figs. 3 and 8, a stop $t^8$. The other five of the carriers have fixedly mounted in their inner ends suitable tools to act upon the interior of the blank and form therein the longitudinal bore and the chamber in its head. Each of the carriers is longitudinally grooved to receive a spline or key $t^{10}$, (see Fig. 7,) so that the carrier can move longitudinally in the head, but is held from rotation therein, and each carrier is also provided with a collar $t^9$, having a radial lug or stop $t^{11}$, the collars being located adjacent the inner face of the disk T when a carrier is retracted.

A better understanding of the several tools necessary to bore and chamber the bobbin-blank will be gained from an inspection of Fig. 11, wherein a completed bobbin is shown having a chamber $v$ in its head V and a central bore $v'$, extended longitudinally of the bobbin through the barrel V' thereof and reduced in diameter near the tip of the bobbin, as at $v^2$, the reduced portion being arranged to fit the tip of the usual spindle in the spinning-frame. The direction of rotation of the shaft $d^{20}$ and the tool-carrier head is shown by arrow 702, Figs. 6 and $8^a$, and the first tool which is brought into operative position as regards the blank is mounted in the carrier $t^2$, viewing Fig. $8^a$. This tool $u^2$ is a starting tool or drill to properly locate the beginning of the longitudinal opening through the blank, the subsequent tools acting to complete the opening. After the tool $u^2$ has performed its work it is withdrawn from the blank, as will be described, the head is rotated through one-sixth of a revolution, and the next tool $u^3$ is brought into operative position and is moved forward to act upon the blank, this tool or drill acting to rough out the large portion $v'$ of the bore, after which the tool is withdrawn, the head is given another partial turn, and a drilling or boring tool $u^4$ is brought into operation to drill the small portion $v^2$, Fig. 11, of the bore. At the time the tool $u^3$ operates upon the bore $v'$ it also partly forms or roughs out the chamber $v$. A bore-finishing tool $u^5$, mounted on the carrier $t^5$, is preferably arranged to finish the bore, and, finally, a reamer or similar tool $u^6$, mounted on the tool-carrier $t^6$, is brought into operative position to ream out and finish the chamber $v$ in the head of the bobbin. Thus in the present embodiment of my invention five tools are used to complete the internal configuration of the bobbin, and these tools are brought into operative position opposite the work one after another by step-by-step rotative movement of the head, and they are individually moved toward and away from the work, by means to be described, to perform their desired functions.

The step-by-step rotation of the tool-carrier head is effected, as has been explained, by the coöperation of the intermittingly-rotating stud $d^{11}$ and the disk $d^{18}$, and the timing of the parts of the apparatus is such that when one of the blanks is being fed forward through the open chuck or work-holder, as described, the stop $t^8$ will be in its operative position in alinement with the center of the chuck and it will have been moved forward to its extended position to stop the feed movement of the blank at the proper point.

The bearing $A^{13}$ and the bed $A^{11}$, connecting said bearing with the bearing $A^{14}$, are grooved at $a^{13\times}$ and $a^{11}$, respectively, (see Figs. $8^a$ and 7,) to receive a slide-bar $e$, having rack-teeth $e^\times$ on its under face and slidable in parallelism with and below the shaft $d^{20}$. A longitudinal upright rib $e'$, secured to or forming a part of the slide or rack bar $e$, is provided near its outer end with a notch $e^2$ (see Fig. 8) in the path of movement of the radial projections or stops $t^{11}$ and so arranged that when one of the stops enters the notch the inward longitudinal movement of the rack-bar will through its engagement with the projection $t^{11}$ move the connected tool-carrier in unison with the rack-bar, the carrier at that time sliding in the ends T T' of the head. A guard $T^\times$ (shown in front elevation in Fig. $3^a$ and ∩-shaped) is rigidly secured to the bed $A^{11}$, adjacent and at the right of the path of movement of the projections $t^{11}$, (see Figs. 1, 3, and 8,) so that no one of the several carriers can accidentally move inward until it is between the separate legs of the guard, and when the projection is in such position it can enter the notch $e^2$ in readiness to be slid inward by the movement of the rack-bar. Locking-notches $t^{12}$ are made in the periphery of the flange $t$, as best shown in Fig. 7, six of such notches being herein shown and alternating in angular position with the projections $t^{11}$, the latter being alined with the notches $t^\times$ in the flange $t'$ of the inner end of the head. A latch 60, Fig. 7, is secured to a rock-shaft 61, mounted on the bed $A^{11}$ and having fast upon it a rocker-arm 62, provided with a peculiarly-shaped depending extension 63, terminating in a toe 64, held by a spring 65 in the position to coöperate with a tappet 66, secured to or forming part of a collar 67, fast on the one-revolution shaft $d^6$. The tappet 66 is so disposed angularly with relation to the arm $d^{10}$ that when the stud $d^{11}$ enters one of the notches $d^{19}$ of the disk $d^{18}$ the tappet 66 will raise the toe 64 and through the intervening connection rock the shaft 61 to withdraw the latch 60 from one of the notches $t^{12}$, thereby releasing the head and permitting its rotation through one-sixth of a revolution. As soon as the tappet wipes past the toe 64 the spring 65 throws the latch 60 against the periphery of the flange $t$, and as the stud $d^{11}$ leaves the notch $d^{19}$ the latch snaps into the locking-notch $t^{12}$, then opposite thereto. The inner end of the rack-bar $e$ is supported in a guide-bearing $a^{15}$, and the adjacent end of the rib $e'$ is cut away at $e^3$, Fig. 8, to clear the flange $t'$; but the notches $t^\times$ in said flange are so disposed that when the rack-bar is moved inward the higher or main portion of the rib $e'$ can slide through one of such notches. This coöperation of the rib with a notch $t^x$ serves to lock the head from any possible rotative movement during the in-and-out movement of the rack-bar and one of the carriers. A cross-girth $A^{16}$ of the main frame pivotally supports at $e^4$ a segment-gear $e^5$, in mesh with the teeth $e^x$ of the rack or slide bar $e$, the segment-gear being pivotally connected at $e^6$ with a bifurcated link $e^7$, jointed at $e^8$ to a slide-bar E, (clearly shown in Fig. 1,) sustained in guide-bearings $a^{70}$ $a^{80}$ in the lower portions of the stands $a^7 a^8$, said slide-bar being square or polygonal in cross-section, as shown in Fig. 7. A depending lug $e^9$ on the slide-bar E coöperates with a cam-groove $E^9$ on the drum $D^3$, hereinbefore referred to, so that as said drum rotates the slide-bar will be reciprocated and through the coöperation of the segment-gear $e^5$ and rack-bar $e$ the latter will be reciprocated to slide a tool-carrier in and out in the head.

The cam-groove $D^9$ is shaped to give the requisite throw to each tool-carrier in succession in order that the tool or other device mounted thereon may properly perform its function, one complete revolution of the drum $D^3$ conforming to a complete revolution of the tool-carrier head.

Inasmuch as the advance movement of the head should be effected at the instant the tool-carrier-actuating means just described return to normal position, (shown in Fig. 8,) we have provided means to set the clutch members $d^7$ $d^8$ into operation by or through the return movement of the rack-bar $e$, and to this end a trip $e^{10}$ (see Fig. 8) is pivoted at $e^{11}$ in a longitudinal slot $e^{12}$ in the outer end of the slide-bar, the trip being free to rock on its pivot $e^{11}$ in one direction, but being held from rocking movement in the opposite direction by a stop-pin $e^{13}$. The face of the trip is inclined or beveled to wipe over the double beveled end $e^{14}$ of a bell-crank lever $e^{15}$, fulcrumed at $e^{16}$ on the stand $A^{12}$, said lever having one of its arms forked to coöperate with the clutch-sleeve $d^5$, loose on the shaft $d^6$. When the rack-bar $e$ is moved inward, or to the right viewing Fig. 8, the trip $e^{10}$ will lift over the cam or beveled end $e^{14}$ of the bell-crank lever; but on the return movement of the rack-bar the trip will engage the cam $e^{14}$ and depress that arm of the bell-crank lever $e^{15}$, throwing its yoked arm and the sleeve $d^5$ to the left, Fig. 8, to set the clutch, and thereupon the rotation of the shaft $d^6$ is set up and maintained until the shaft has made one revolution.

It will be understood that in Fig. 8 the clutch has just been set by the means described and the shaft $d^6$ is making its single revolution to be stopped automatically as soon as the stop-pin $d^{16}$ can enter the recess $d^{17}$ and permitting the spring (not shown) to separate the clutch members $d^7$ $d^8$.

By providing a number of holes in the slot portion $e^{12}$ of the rack-bar, both for the fulcrum-pin $e^{11}$ of the trip and for the stop-pin $e^{13}$, we can adjust the trip to operate at an earlier or later instant on the inward movement of the rack-bar.

After the stop $t^8$ has been moved inward to stop the feed of the blank at the proper point the blank is clamped in the chuck or work-holder, the stop is withdrawn into the position shown in Fig. 8, and then the head is advanced one step to bring the starting-tool $u^2$ (which may conveniently be a stub-drill) into alinement with the center of the blank, and on the next reciprocation of the rack-bar $e$ the said tool will be moved inward to coöperate with the work, and it will then be withdrawn to permit the next advance of the head, and then the second tool will be moved into and out of coöperation with the work, and so on, until the last tool or reamer $u^6$ has been operated.

It will be manifest that the work or blank is rotated while the tools which coöperate therewith are held from rotation in the present embodiment of our invention, and while these various tools have been operating to internally shape the bobbin the latter has been rough-shaped externally by means now to be described.

Referring more particularly to Figs. 3, 9, and 10, the top of the main frame has bolted to its rear side, near the chuck or work-holder, a cam-plate 70 (shown partly in section and broken off in Fig. 9) to more clearly illustrate the shape of the cam-groove 71, formed on the inner face of the plate, a stud 72, rearwardly extended from a tool-holder 73, traveling longitudinally along the cam-groove. The tool-holder has a sleeve-like hub 74, which slides and rocks upon a cylindrical guide-bar 75, rigidly mounted in bearings 76 77 on the frame, and a flexible member, preferably a chain 78, has attached to one of its ends a weight 79, the chain leading upward over a guide-sheave 80 on the bearing-post 76 and thence substantially horizontally to the tool-holder to which it is connected, the chain passing to the left viewing Fig. 9 from the tool-holder around a guide-sheave 81 on the post 77, thence down around a movably-supported sheave 82, to be again referred to, and up to the top of the frame, to which the chain is rigidly attached.

Referring to Fig. 10, a depending bracket 83 is secured to the frame and has fulcrumed upon it at 84 a follower-arm 85, extended below the shaft $D^x$ in a plane at right angles thereto, said follower-arm being provided with a follower, preferably a roll, as 86, to coöperate with a cam 87, fast on the main shaft $D^x$, the guide-sheave 82 being rotatably mounted on the free end of the follower-arm.

The weight 79 acts to move the tool-holder 73 to the right viewing Fig. 9 and to maintain the follower 86 against the edge of the cam 87. A roughing-tool 88, Fig. 3, is mounted in the tool-holder and extends therefrom into position to engage the exterior of the blank when held in proper position by the chuck or work-holder. The tool 88 at the beginning of its cutting action upon the blank is in the position shown in Figs. 3, 9, and 10, and as the cam 87 rotates the free end of the follower-arm 85 is depressed to act through the chain 78 and gradually move the tool-holder 73 longitudinally to the left, the stud 72 following the cam-groove 71 from its lower to its high point, so that as the tool travels along the work it will rough out the exterior of the latter to give it a substantially conical head portion and a cylindrical barrel. When the operating stroke of the tool-holder 73 is completed, the high point 89 of the cam 87 will have been reached, and from such point the cam drops more quickly along the curve 90 to the circular part or dwell 91 of the cam. (Shown in Fig. 10.) As the follower 86 travels from the high point 89 along the incline 90 of the cam the weight 79 returns the tool-holder to starting position, and while the follower coöperates with the dwell portion 91 the tool-holder remains at rest, giving an opportunity for the blank to be fed forward the requisite distance for the formation of the next bobbin.

We desire to call attention to the fact that the intermittingly-rotatable head in which the tool-carriers are mounted is shown in the same angular position in Figs. 1 and 3; but in Fig. 8 it is shown in a different position, with the stop $t^8$ in the latter figure in position to coöperate with the blank as it is fed forward through the open chuck or work-holder, the change in position being made to more clearly show the different tools.

When the blank is fed forward through the open work-holder or chuck, its leading end passes into a socketed head 301 of a work-support 302, Figs. 10 and 12, shown as an upright metallic plate clamped by a bolt 303 in a longitudinal recess 304, formed in the upper end of an elongated bar 305. The socketed head 301 is made annular in shape, as clearly shown in Fig. 10, to permit the stop $t^8$ to enter the same and engage and stop the leading end of the blank at the proper point, and a radial opening 306 is made in the head to permit the roughing-tool 88 to travel longitudinally of the blank without engaging the work-support. The bar 305 is provided with a hub 307, Fig. 12, which is rigidly secured to a rod 308, which is longitudinally movable in a sleeve-bearing 309, having ears 310, which are bolted to the under side of the top of the main frame near the bearing-post 76. A spring $s^{50}$ is coiled around the rod between the hub 307 and the adjacent end of the bearing 309 to normally force the rod and bar 305 to the left, Fig. 12, and toward the chuck $C^2$, the head 301 being in axial alinement therewith. A collar 311, fast on the opposite end of the rod 308, limits its spring-induced movement, and one of the ears 310 is provided with a hanger 312, carrying a sheave 313. A chain or other flexible connection 314 is secured by a pin 315 to the bar 305, passing thence over the sheave 313 and down to a rocking follower-arm 316, fulcrumed at 317 on a bracket 318, secured to the main frame. (See Fig. 10.) This follower-arm extends beneath the shaft $D^\times$ and is provided with an upturned toe 319 (see dotted lines, Fig. 10) in the path of a tappet 320, fast on said shaft, the tappet acting to depress the arm 316, and thereby to pull down on the chain 314 to move the bar 305 and the work-support away from the chuck $C^2$ against the action of spring $s^{50}$.

In order to prevent any swinging movement of the work-support 302 the lower end of the bar 305 bears against the shaft $D^\times$ and is slidably connected therewith by a foot 321, which partly embraces the shaft, as shown in Fig. 10. Referring to said Fig. 10 it will be seen that the cam 87 is just about to begin the movement of the roughing-tool 88 along the blank and the tappet 320 is acting upon the toe 319 to retract the work-support; but as the shaft $D^\times$ turns the toe is released and the spring $s^{50}$ moves the work-support into position, so that the outer end of the blank is supported in the socketed head 301. The blank rotates in the head, but is prevented thereby from chattering or vibrating while the roughing-tool and the several boring-tools are acting upon the blank, as hereinbefore described, it being manifest that such boring-tools can move forward and back through the annular head 301. When the rotation of shaft $D^\times$ again brings the tappet 320 into engagement with the toe 319 to retract the work-support from the outer end of the rough-finished and bored bobbin, the latter is in readiness to be removed to the finishing-tools.

After a bobbin has been bored and rough-finished it is cut off at its tip end from the blank and automatically transferred to the finishing mechanism, which imparts to the bobbin its external finished contour, and the finished bobbin is automatically removed from the machine, the blank being fed forward into position for the formation of a new bobbin while the rough-finished bobbin is being finished, and we will first describe the finishing mechanism and thereafter the automatic means for transferring the rough-finished bobbin to said finishing mechanism.

Referring to Figs. 1 and 3, the top of the main frame is extended forward to form a table $A^{20}$, on which are bolted base-plates M N, the former having upright standards forming bearings $m$ for a rotatable spindle $M^\times$, having a tapered end $m^\times$, adapted to enter the chambered head of the bobbin, said shaft having fast upon it a pulley $m'$, adapted to be rotated by a belt $M'$ (see Fig. 1) and driven from a suitable source of power. A yoke $m^2$ is pivotally connected with a loose collar $m^3$ on the outer end of the spindle $M^\times$ and prevented from longitudinal movement thereon by suitable fast collars $m^4$, the stem of the yoke depending below the shaft and being fulcrumed at $m^5$ on an ear $m^6$ on the base-plate M, the foot of the extension constituting a follower $m^7$, which travels in a groove $m^8$, formed in the circumference of a cam-disk $m^9$, fast on a shaft $m^{10}$, rotatably mounted in suitable bearings on brackets or wings 100, 101, 102, and 103, secured to or forming part of the table $A^{20}$. As the shaft $m^{10}$ makes one complete revolution the spindle $M^\times$ will be moved outward or to the right, viewing Figs. 1 and 3, into operative position (shown in said figures) and after a dwell in such position will be moved outward to release the then-finished bobbin. The base-plate N supports an elongated bearing $n$ for a rotatable spindle $N^\times$, having a tip $n^\times$, adapted to enter the small bore previously made in the tip of the bobbin, the said spindle being moved in and out in the bearing by means of a yoke $n^2$, fulcrumed at $n^5$ and having a follower $n^7$ cooperating with the path $n^8$ of a cam-disk $n^9$, fast on the shaft $m^{10}$ at the right-hand end thereof, Figs. 1 and 3, the cam-grooves $m^8$ $n^8$ being similar, but reversely located, so that the two spindles, which are in alinement, will be moved toward or from each other simultaneously, the yoke $n^2$ being operatively connected with the spindle $N^\times$ in such a manner as has been described with relation to the yoke $m^2$ and spindle $M^\times$. The latter spindle is a driven spindle, as will be manifest, while the spindle $N^\times$ is what may be termed a "dead-spindle," as it rotates only by or through frictional engagement of its tip with the bobbin. The spindle-controlling shaft $m^{10}$ has fast upon it a gear $m^{11}$, in mesh with a gear $m^{12}$, fast on a counter-shaft $m^{13}$, supported in bearings on the brackets 101 102, the counter-shaft having an attached sprocket $m^{14}$, driven by a sprocket-chain $m^{15}$ in engagement with a second sprocket $m^{16}$ on the main shaft $D^\times$, a sprocket-chain and gears being preferably used in order to insure a positive and accurately-timed rotation of the counter-shaft. An upright segmental arm $m^{19}$ is provided with an elongated hub $m^{18}$, loosely mounted on the counter-shaft between fast collars $m^{17}$ thereon, the curved upper edge of the segmental arm being provided with gear-teeth $m^{20}$, and a roller or other stud $m^{21}$, projecting laterally from the arm, (see Fig. 1,) enters a cam-groove $m^{22}$ (see Fig. 10) in a disk $m^{23}$, fast on the spindle-controlling shaft $m^{10}$. The table $A^{20}$ has rigidly secured to it between the base-plates M N a heavy bed $H^\times$, transverse to the length of the main frame of the machine and provided with undercut and parallel horizontal guideways $h^\times$ (clearly shown in Fig. 1) for guide-ribs $h$, arranged on the sides of a carriage H, which latter carries a rack $h'$ (see Figs. 1 and 10) in mesh with the segmental gear $m^{20}$. As shown in Figs. 3 and 10, the carriage is provided with three undercut transverse grooves $h^2$ $h^3$ $h^4$ to receive the posts of suitable tool-holders. A cutting-off tool $H^4$ is secured to a tool-holder $h^{40}$, clamped in adjusted position in the groove $h^4$, the cutting-off tool being so adjusted that when the carriage is moved toward the back of the machine said tool will engage and cut off the rough-finished bobbin at the desired point, the adjustment provided by the groove $h^4$ enabling bobbins of various lengths to be made by the machine. The groove $h^3$ receives the holder $h^{30}$ of what may be termed a barrel-finishing tool $H^3$, the edge of the tool being shown in plan view in Fig. $3^c$, said tool acting upon the barrel of the rough-finished bobbin to finish the same, while such bobbin is clamped between and rotates with the finishing-spindles $M^\times$ $N^\times$, as hereinbefore described. The other finishing-tool $H^2$, the cutting edge of which is shown in plan in Fig. $3^b$, is mounted upon the holder $h^{20}$, adjustably seated in the groove $h^2$, and inasmuch as any suitable tool-holders or posts may be used we have not described the same in detail, as such tool-holders *per se* form no part of our invention.

After the rough-finished bobbin has been transferred to and clamped between the spindles $M^\times$ $N^\times$ the rotation of the cam-disk $m^{23}$ operates to oscillate the segment-gear and the carriage H is reciprocated, the top $H^2$ acting upon the base or head portion of the bobbin on one stroke of the carriage, while on its opposite stroke the barrel-finishing tool $H^3$ acts upon the bobbin and externally finishes the barrel thereof, and referring to Fig. 10 it will be seen that the two finishing-tools are located in different horizontal planes, and, as illustrated, the tool $H^2$ acts above the axis of the bobbin, while the tool $H^3$ acts below it. The bobbin having been finished, the cam-grooves $m^8$ $n^8$ operate to separate the supporting-spindles, and the finished bobbin is then picked up and discharged from the machine. For this purpose a rock-shaft $h^5$ is mounted in bearings $h^6$ on the front end of the carriage, said rock-shaft having secured to it two rearwardly-extended and parallel arms $h^7$, provided at their rear ends with substantially U-shaped seats $h^8$. A disk $h^9$ on one end of the rock-shaft has secured to it at $h^{10}$ a flexible band or strap $h^{11}$, which passes around a portion of the periphery of the disk and is connected at its lower end to a bell-crank $h^{12}$, fulcrumed on a stud $h^{13}$ on the bracket 101, (see Fig. 1,) the depending arm $h^{14}$ of the bell-crank being located in the path of a tappet-cam $h^{15}$, (see Fig. 10,) rigidly secured to the counter-shaft $m^{13}$. The tappet-cam is so set on this counter-shaft that it will engage the toe of the bell-crank and quickly rock the same just as the finished bobbin is released by the spindles $M^\times N^\times$, such rocking movement of the bell-crank acting, through the flexible connection $h^{11}$, to quickly turn the disk $h^9$ in the direction of the arrow 200, Fig. 10, to swing the knock-off arms $h^7$ upward and forward, the seats $h^8$ engaging the finished bobbin, lifting the same, and throwing it forward out of the machine and into any suitable receptacle. The finishing-tool $H^2$ has its cutting edge shaped to give the external contour to the base or head V of the bobbin, as shown in Fig. 11, and the stepped configuration of the barrel V' of the bobbin is effected by the finishing-tool $H^3$, as will be manifest from a comparison of Figs. $3^b$ and $3^c$ with Fig. 11. By changing the shape of the cutting edges of these tools the bobbin will be finally shaped in accordance with such change, so that it is to be understood our invention is not in any manner restricted to the formation of bobbins having only the configuration herein shown.

The means to transfer the rough-finished bobbin (when cut off from the blank) into position between and to be clamped by the spindles $M^\times N^\times$ will now be described.

An upright standard G is erected on the top of the main frame midway between the axis of rotation of the work-holder and the alined spindles $M^\times N^\times$, said standard being surmounted by a tubular boss $g$ to receive the stud $g'$ of a rocking guide $g^2$, having in its vertical face a longitudinal undercut guideway $g^3$, (see Fig. 3,) a slide-bar $g^4$, shaped in cross-section to correspond with the guideway, being sustained by and longitudinally movable in the rocking guide $g^2$. At its upper end the slide-bar is turned over at $g^5$ and provided with a longitudinally-adjustable stop $g^6$ to limit the downward longitudinal movement of the slide-bar and to take up any wear which may develop in the mechanism for operating the slide-bar, the lower end of the slide-bar having a boss $g^7$ parallel to the axis $g'$ of the guide. A rod $g^8$ is fixedly held in said boss and extends at right angles to the slide-bar in parallelism with the centers of the chuck and finishing-spindles. Two hubs $g^9$ are adjustably secured to the rod $g^8$ and depend therefrom in parallelism with the slide-bar, each hub having secured to it a pair of spring-fingers $g^{10}$, (shown clearly in Fig. 10,) the free ends of the fingers being oppositely bent and then flared, as at $g^{11}$. The rod $g^8$ is extended through the boss $g^7$ and forms a pivotal connection between the slide-bar $g^4$ and an oscillating arm $g^{12}$, fast on a rock-shaft $g^{13}$, mounted in a bearing $g^{14}$ on the standard G. A pinion $g^{15}$ is secured to the rock-shaft $g^{13}$ and meshes with the teeth $g^{16}$ of a reciprocating rack-bar $g^{17}$, held in engagement with the pinion by guide-rolls $g^{18}$, Fig. 10, suitably mounted on the standard G. The lower end of the rack-bar passes through a slot 250 in the table $A^{20}$ of the main frame and is pivotally connected at $g^{19}$ with a lever $g^{20}$, fulcrumed on the shaft $m^{10}$. The forwardly-extended lever-arm carries a lateral roller or other stud $g^{21}$, which enters a cam-groove $g^{22}$ in the side of a disk $g^{23}$, fast on the counter-shaft $m^{13}$.

The shape of the cam-groove is clearly shown in Fig. 10, and in said figure we have shown in dotted lines the two positions of the slide-bar $g^4$ and its attached fingers, the dotted-line position at the right showing the fingers in position to embrace a rough-finished bobbin and to support it as soon as the latter is cut off from the blank by the cutting-off tool $H^4$, hereinbefore described. The left-hand dotted position of the guide-bar and fingers shows the latter in position to place the cut off and rough-finished bobbin between the spindles $M^\times N^\times$ while said spindles are being moved toward each other to clamp the bobbin between them. The slide-bar $g^4$ and fingers carried thereby constitute a transferrer, and when the rack-bar $g^{17}$ is in mid-position (shown in Fig. 10) the oscillating arm $g^{12}$ is in vertical position, as will be the transferrer, midway between the chuck or work-holder and the clamping-spindles. The stud $g^{21}$ is shown as traversing the circular part 600 of the cam-groove, and consequently the rack-bar and transferrer will remain at rest in mid-position until the roll enters the part 601 of the cam-groove, the latter dropping toward the center of the cam, so that the rear end of the lever $g^{20}$ will be elevated, lifting the rack-bar $g^{17}$ and rotating the pinion and its attached shaft $g^{13}$ in the direction of the arrow 650. This rotative movement brings the transferrer into the right-hand dotted-line position, Fig. 10, it being understood, of course, that the slide-bar $g^4$ during such movement slides longitudinally in the rocking guide $g^2$, while the latter rocks on its fulcrum-stud $g'$. As the transferrer completes its movement into the right-hand dotted-line position, Fig. 10, the flared ends $g^{11}$ of the spring-fingers $g^{10}$ wipe over the rough-finished bobbin, and the latter is cut off from the blank, while the roll $g^{21}$ traverses the dwell portion 602 of the cam-groove $g^{22}$, the dwell being necessary to enable the fingers to properly embrace the bobbin before the latter is cut off. As soon as the cutting-off operation is completed the roll $g^{21}$ enters the rising portion 603 of the cam-groove, and the rack-bar $g^{17}$ is lowered far enough to swing the arm $g^{12}$ from the right-hand dotted-line position into the left-hand dotted position, Fig. 2, the transmitter-fingers carrying the bobbin into position between the clamping-spindles, and while the latter are moving toward each other to clamp the bobbin the dwell portion 604 of the cam-groove causes the transferrer to remain in that position. As the clamping by the spindles is effected, however, the roll $g^{21}$ enters the falling portion 605 of the cam-groove, and the rack-bar is raised from its lowest position to mid-position, (shown in Fig. 10,) whereupon the long dwell 600 acts to retain the transferrer in mid-position until it is time for the next bobbin to be engaged before it is off from the blank. While the transferrer is in mid-position one bobbin is being bored and rough-finished externally and the other bobbin is being finished externally by means hereinbefore described, and the finished bobbin is thrown out of the machine by the means described as soon as the clamping-spindles separate to release it.

The effective length of the rising part 603 of the cam-groove $g^{22}$ is equivalent to the combined effective lengths of the falling portions 601 605, as will be manifest from Fig. 10, as the latter part moves the arm 612 from the left to center position and the former part 601 moves said arm from center position to right-hand dotted-line position.

The two pairs of transferrer-fingers are set on the supporting-rod $g^8$ in such position that each pair will grasp the barrel of the bobbin, and while the tips of the fingers actually move through short arcs as they approach or recede from a bobbin the arcs are comparatively flat and the resiliency of the fingers enables them to readily embrace and clasp the bobbin.

We may employ any suitable means to return the rock-shaft $h^5$ of the knock-off device to normal position, and in Fig. 3 we have shown a spring $s^{10}$ coiled around the shaft between one of the arms $h^7$ and the left-hand bearing $h^6$, the ends of the spring being secured to said arm and bearing, respectively, and the spring is so wound as to turn the rock-shaft $h^5$ oppositely to the arc 200, Fig. 10. This spring acts as a check to prevent undue movement of the knock-off arms when the bobbin is ejected or discharged from the machine and also returns the arms to normal position in readiness to act upon the next bobbin to be ejected.

In Fig. 3 the carriage H is shown as having an opening $H^5$ between the portions grooved at $h^2 h^3$, such opening being beneath the clamping-spindles and affording a means of escape for the chips cut from the bobbin by the finishing-tools $H^2 H^3$.

In the apparatus hereinbefore described the entire handling of the work is automatic from the time the blank-stock is delivered to the feed mechanism to the time the finished bobbin is discharged or ejected, and the mechanism is so arranged that two bobbins are being operated upon simultaneously—one bobbin being rough-finished and bored while another bobbin is being finished.

Various changes or modifications may be made in the details and arrangement of the apparatus herein shown and described without departing from the spirit and scope of our invention.

Having fully described our invention, what we claim as new, and desire to secure by Letters Patent, is—

1. In apparatus of the class described, a support for a reserve supply of cylindrical blanks, a longitudinally-movable, reciprocating blank-feeder, gravity-actuated on its feed-stroke, means automatically and intermittingly connected with the blank-feeder to positively retract it, intermittingly-acting means to deliver a blank from the support into the path of and to be engaged by the feeder on its feed-stroke, a rotating work-holder adapted to receive through it and alternately clamp and release a blank, the latter being fed through the work-holder when open, and means to act upon the blank independently of the blank-feeder and determine the extent of feed.

2. In apparatus of the class described, a rotating tubular work-holder, provided with clamping means, a blank-feeder, means to effect by gravity its feed movement to feed a blank forward through the work-holder, a retracting device for the feeder, comprising a threaded, continuously-rotating shaft extending the length of and parallel to the path of movement of the feeder, and a member on the latter to coöperate with said shaft, coöperation of said member and the shaft effecting a continuous retracting movement of the blank-feeder to the starting-point of its feed-stroke, and means to effect automatically such coöperation when the blank-feeder reaches a predetermined point on its gravity-actuated stroke.

3. In apparatus of the class described, a reciprocating blank-feeder, a continuously-rotating, threaded retracting-shaft, a follower to coöperate therewith and mounted on the feeder, means independent of the shaft to cause forward movement of said blank-feeder, means to automatically effect coöperation of the shaft and follower at a predetermined point on the feed-stroke of the blank-feeder, to retract the latter, and a releasing device to automatically disengage said follower from the shaft when the retractive movement of the feeder is completed.

4. In apparatus of the class described, a reciprocating blank-feeder, a continuously-rotating, threaded retracting-shaft, a follower to coöperate therewith and mounted on the feeder, gravity-actuated means to cause forward movement of the blank-feeder, means to automatically effect coöperation of the shaft and follower to retract the feeder, and an adjustable releasing device to automatically disengage the shaft and follower when the blank-feeder has been retracted to a predetermined point.

5. In apparatus of the class described, a rotating work-holder, a reciprocating blank-feeder adapted to feed a blank to said work-holder, gravity-actuated means to cause feed movement of the said feeder, positive retracting means, including a continuously-moving elongated member extended the length of and parallel to the path of movement of the feeder, separate devices to automatically effect coöperation and disengagement respectively of the retracting means and the blank-feeder at predetermined points in the path of movement of the blank-feeder, and means to positively engage and deliver a blank into position to be engaged and fed by the blank-feeder when the latter has been retracted.

6. In apparatus of the class described, a rotating work-holder, a reciprocating blank-feeder adapted to feed a blank to said rotating work-holder, gravity-actuated means to cause feed movement of said feeder, positively-retracting means, including a continuously-rotating, threaded shaft, separate devices to automatically effect coöperation and disengagement, respectively, of the retracting means and the blank-feeder at predetermined points in the path of movement of the latter, means to sustain a plurality of blanks in reserve, and intermittingly-operating let-off mechanism to positively engage and effect delivery of the endmost blank from said sustaining means into the path of the blank-feeder when retracted, the let-off mechanism being controlled as to its operation by the blank-feeder in its retractive movement.

7. In apparatus of the class described, a rotating work-holder, a reciprocating blank-feeder adapted to feed a blank to said rotating work-holder, gravity-actuated means to cause feed movement of said feeder, positive retracting means, separate devices to automatically effect coöperation and disengagement, respectively, of the retracting means and the blank-feeder at predetermined points in the path of movement of the latter, let-off mechanism to engage a reserve blank and maintain it out of the feeder-path, and means governed by the retractive movement of the blank-feeder to operate said mechanism to deliver positively a blank into position to be fed before the blank-feeder begins its feeding movement.

8. In apparatus of the class described, a reciprocating blank-feeder gravity-actuated on its feed-stroke, means to automatically retract it when its feed-stroke is completed, means to sustain a series of blanks in reserve, let-off mechanism to positively engage and deliver such blanks singly into the feeder-path when the latter is retracted, and means governed by the blank-feeder to effect automatically the actuation of the let-off mechanism.

9. In apparatus of the class described, a tubular, rotating, work-holder adapted to receive a blank, means to cause said work-holder to clamp and release a blank, a blank-feeder reciprocable in alinement with the work-holder and actuated by gravity on its feed-stroke, means to automatically and temporarily coöperate with and retract it when its feed-stroke is completed, means to sustain a series of blanks in reserve, let-off mechanism to positively engage and deliver such blanks singly into the feeder-path when the latter is retracted, and means governed by the blank-feeder to effect automatically the actuation of the let-off mechanism.

10. In apparatus of the class described, a rotating work-holder to receive a blank, means to open and close said work-holder, to release and clamp a blank, a blank-feeder reciprocable in alinement with the work-holder, to feed a blank thereto, adjustable means to sustain a series of blanks in reserve, intermittingly-operative let-off mechanism, including rotative members, to normally hold the endmost blank of the series and to engage and move it into position to be fed, and actuating means for said let-off mechanism, including a pawl and ratchet to actuate said rotative members, operated by the blank-feeder when retracted in readiness to engage a fresh blank.

11. In apparatus of the class described, a rotating work-holder, a rotatable head, comprising two rigidly-connected ends each having a series of circularly-arranged apertures, tool-carriers longitudinally movable in the apertured ends of the head and prevented from axial rotation, a radial lug fast on each tool-carrier, a fixed, transverse guard adapted to slidably engage simultaneously all but one of the lugs and prevent longitudinal movement of their tool-carriers, actuating means for the latter, including a reciprocating member having a transverse notch to be entered by the lug of the free tool-carrier, to move the latter out and back, means to intermittingly and positively rotate the head a predetermined amount to move one carrier after another into released position in alinement with the work-holder, whereby the tool-carriers are in succession advanced and retracted by coöperation with the said actuating mechanism, and a notched flange on the head into and out of engagement with which said reciprocating member slides, to lock the head when a tool-carrier is advanced and retracted.

12. In apparatus of the class described, a rotating work-holder, a head having a circularly-arranged series of longitudinally-movable tool-carriers mounted therein, actuating mechanism to coöperate with one tool-carrier at a time and move it toward and from the work-holder, intermittingly-acting means, including a notched disk rotatable with the head and a revolving stud to coöperate with the disk, to rotate the head step by step to present the tool-carriers singly into position to be reciprocated by said actuating mechanism in axial alinement with the work-holder, a rotating shaft, connections, including a clutch, between it and the revolving stud of said intermittingly-acting means to operate the latter, separate connections between the shaft and the said actuating mechanism, and a device positively operated by the latter when a tool-carrier has been retracted to set the clutch and start the operation of the means for rotating the head.

13. In an apparatus for making bobbins, means to hold and rotate a bobbin-blank, boring and rough-shaping tools to act internally and externally, respectively, upon the blank, separable, axially-alined rotatable spindles adapted to receive between them and clamp a rough-shaped bobbin, controlling means for said spindles, a carriage adapted to reciprocate in a path at right angles to said spindles and blank-holding means, a cutting-off tool on the carriage to cut the rough-shaped and bored bobbin from the blank, blank-feeding means, two oppositely-facing finishing-tools on the carriage, to finish the head and barrel of the bobbin when clamped by and rotating with said spindles, and means to transfer to the latter a rough-shaped bobbin when cut off from the blank.

14. In an apparatus for making bobbins, separate means located adjacent each other to rough-shape and finish a bobbin, respectively, a swinging transferrer located between them and having spring-fingers to embrace a bobbin, between its ends, an upright standard on which the transferrer is vertically movable, and mechanism to move said transferrer vertically and laterally and bodily at right angles to the axis on which it swings, to effect engagement of the spring-fingers with a rough-shaped bobbin between its ends and transfer the same to the finishing means, and thereafter to retract the transferrer to normal intermediate position.

15. In apparatus for making bobbins, an upright standard, bobbin-transferring means supported thereby and comprising a longitudinally-movable, laterally-swinging member having a finger-support extended at right angles thereto, a slidable connection between the standard and the said member, the latter being pivoted on said connection parallel to the finger-support, spring-fingers depending from and fixedly mounted on said support, to embrace a bobbin between its ends, and an oscillating arm mounted on a fixed fulcrum and pivotally connected with said movable member, to raise and lower the same and swing it in a plane at right angles to the axis of the arm.

16. In apparatus for making bobbins, an upright standard, a guide-block fulcrumed thereon, an elongated bar slidable in said guide-block, pairs of spring-fingers movable with and sustained by the bar, an oscillating shaft mounted on the standard below and parallel to the fulcrum of the guide-block, and an arm fast on the shaft and pivotally connected with the lower end of the bar, whereby oscillation of the shaft will swing the bar and slide it longitudinally up and down in the guide-block.

17. In apparatus for making bobbins, means, including a rotating work-holder, to bore and rough-shape a bobbin, separate means, including clamping-spindles parallel to the work-holder, to finish a bobbin, intermediate bobbin-transferring means, comprising a member adapted to swing and move longitudinally in a vertical plane at right angles to said work-holder and clamping-spindles, resilient fingers carried by said member and movable thereby to grasp a bobbin when bored and rough-shaped and transfer it into position between the clamping-spindles, and an oscillating arm pivotally connected with and to actuate the swinging member.

18. In apparatus of the class described, a rotating work-holder to receive and intermittingly clamp a blank, means to feed the latter through said work-holder when unclamped, a work-support having an annular, socketed head to receive and sustain the outer end of the blank, a stop movable into position through said annular head, to engage the leading end of the blank, and determine the length of its speed movement, and tools to act upon the blank while clamped in the work-holder and having its outer end rotatably sustained by the work-support.

19. In apparatus of the class described, a rotating work-holder to receive and intermittingly clamp a blank, means to feed the latter through said work-holder when unclamped, a work-support having an annular, socketed head to receive and sustain the outer end of the blank, a stop movable into position through said annular head, to engage the leading end of the blank, and determine the length of its speed movement, tools to act upon the blank while clamped in the work-holder and having its outer end rotatably sustained by the work-support, and means to automatically retract said work-support from the end of the blank.

20. In apparatus of the class described, a rotating work-holder adapted to receive and clamp the work, means to feed the latter through the work-holder, a stop to engage the leading end of the work and determine the extent of feed movement thereof. a work-support having an annular, socketed head to receive the leading end of the work and to sustain it while permitting its rotation, tools to bore and to rough-shape the exterior of the work while clamped in the work-holder and sustained by the work-support, means to yieldingly retain the latter in its operative position, and means to retract the work-support from coöperation with the work when the operation of the tools has been completed.

21. In apparatus of the class described, a rotatable work-holder adapted to receive and intermittingly clamp the work, means to feed the work through said work-holder when unclamped, a work-support having a socketed, annular head in axial alinement with the work-holder, to sustain the outer end of the work, a sleeve-like bearing, a rod longitudinally slidable therein, and to which the work-support is secured, a spring to move the work-support toward the work-holder, and means to positively retract the work-support against the action of the spring and move it into position to release the work.

In testimony whereof we have signed our names to this specification in the presence of the subscribing witnesses.

IRA F. PECK.
CHARLES HIRD.

Witnesses:
ARTHUR M. ALDRICH,
L. M. STONE,
H. H. RICKER,
ALB. P. POSSNER.